J. G. NORTHWAY.
Thrashing Machine Brace.
No. 65,587.
Patented June 11, 1867.
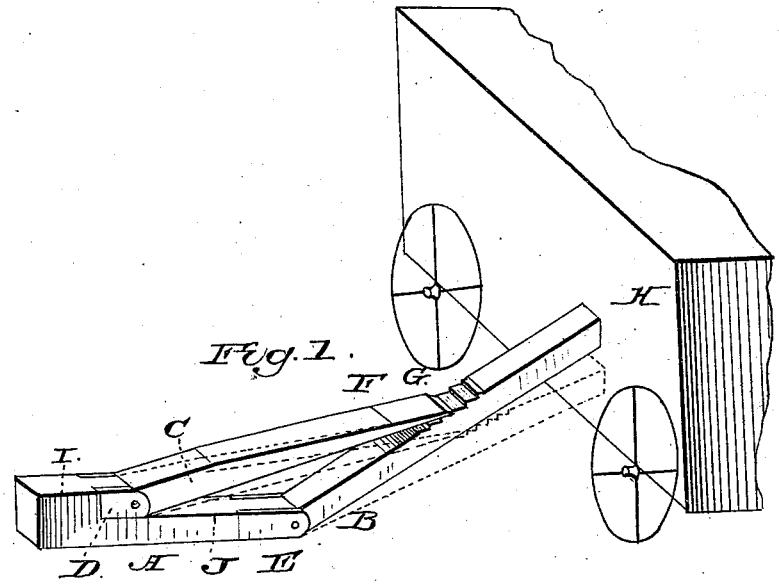
witnesses
Julius F. Yatton
A. G. Cole
Inventor.
J. G. Northway
By his atty
G. L. Chapin

United States Patent Office.

I. G. NORTHWAY, OF KENOSHA, WISCONSIN.

Letters Patent No. 65,587, dated June 11, 1867.

---

BRACE FOR SUPPORTING THRESHING MACHINES.

---

*The Schedule referred to in these Letters Patent and making part of the same.*

---

TO ALL WHOM THIS MAY CONCERN:

Be it known that I, I. G. NORTHWAY, of Kenosha, in the county of Kenosha, and State of Wisconsin, have invented a Brace for Supporting Threshing Machines and other purposes; and I do hereby declare that the following is a full, clear, and exact description of the construction and operation of the same, reference being had to the accompanying drawings, and letters of reference marked thereon, making a part of this description, in which—

Figure 1 is a perspective representation of my invention in position for use.

The nature of my invention consists of a brace having three parts, two joints, and a rack, the whole being arranged so that when the bed is securely anchored the end of the brace may press against the thresher and prevent it from having a lateral motion, while a suitably-arranged dog is made to hold the brace in place.

I am aware that various devices have been used to support portable machinery, and especially threshing machines, but claim that my invention differs from any heretofore employed for such a purpose, and possesses advantages over all others in the following particulars: The bed is arranged to rest on the ground or barn floor, to suit circumstances; and as the dog is arranged to hold the brace at any desired inclination, no annoyance is suffered in its getting out of place. The common method of supporting threshers is to block the wheels at the floor, and thus prevent them from sliding; but as this arrangement throws all of the lateral strain upon the spokes and other parts of the gearing, without controlling materially the shaking motion, some other means are necessary which will bear against the thresher nearer the cylinder and saddles which cause the motion. I claim that as my device is arranged to brace the thresher at any point desired and hold it steady in place, a very important improvement is made over any device now in use for a similar purpose; and as it can be made both light and cheap no objection seems sufficient to prevent it from coming into general use for the purpose set forth.

In order to give a correct understanding of my invention, I have marked each part with distinct letters, and will now give a detailed description.

A represents what I term the bed of the brace, having at I a height equal to the thickness of brace B and dog C, by which means a strong shoulder is provided for supporting the dog C at the end where it is hinged to bed A, as seen at D. The bed should be made of a single piece of wood, and have the thin part J extend out about one-half of the length of brace B, which is also hinged to the part J at E, and arranged to be set at any desired angle for bracing the thresher shown at H. The top of brace B has a rack, G, against which the metal-pointed end F of dog C is made to operate and hold the brace B in a fixed position against thresher H. It is not essential that the hinges D E be made precisely as shown in the drawing, but they should be made so as to allow the parts C B to have only a vertical motion. The device may also have its proportions changed and yet answer the purpose, and may be for most uses made much lighter than represented.

Operation.

Any number of braces may be used, but one at each side of the thresher will be sufficient for all practical purposes. The bed A should set a suitable distance from the thresher and anchored fast, and the brace B placed against the side of the same, as seen at H, and pressed down with moderate force, and the operation will be complete.

Having thus fully described my device, what I claim, and desire to secure by Letters Patent of the United States, is—

The combination of bed A, brace B, and dog C, when arranged substantially as set forth.

I. G. NORTHWAY.

Witnesses:
   A. G. COLE.
   JULIUS F. YATTOW,